United States Patent [19]
Birch
[11] Patent Number: 5,018,834
[45] Date of Patent: May 28, 1991

[54] ADDRESSING SCHEME FOR MULTIPLEXED FERRO-ELECTRIC LIQUID CRYSTAL

[75] Inventor: Martin J. Birch, Teddington, Great Britain
[73] Assignee: STC PLC, London, England

[21] Appl. No.: 432,577
[22] Filed: Nov. 6, 1989

[30] Foreign Application Priority Data

Nov. 23, 1988 [GB] United Kingdom ................ 8827384

[51] Int. Cl.[5] ................ G02F 1/13
[52] U.S. Cl. ................ 350/333; 350/350 S; 340/784; 340/805
[58] Field of Search ................ 350/333, 332, 350 S; 340/805, 811, 784

[56] References Cited

U.S. PATENT DOCUMENTS

| | | | |
|---|---|---|---|
| 3,982,239 | 9/1986 | Sherr | 350/333 |
| 4,712,872 | 12/1987 | Kanbe et al. | 350/333 |
| 4,870,398 | 9/1989 | Bos | 350/333 |

FOREIGN PATENT DOCUMENTS

| | | |
|---|---|---|
| 0306203A | 3/1989 | European Pat. Off. . |
| 2141279A | 12/1984 | United Kingdom . |
| 2146473A | 4/1985 | United Kingdom . |
| 2173335A | 10/1986 | United Kingdom . |
| 2173336A | 10/1986 | United Kingdom . |
| 2173337A | 10/1986 | United Kingdom . |
| 2173629A | 10/1986 | United Kingdom . |

*Primary Examiner*—Andrew J. James
*Assistant Examiner*—Sara W. Crane
*Attorney, Agent, or Firm*—Lee, Mann, Smith, McWilliams & Sweeney

[57] ABSTRACT

A ferroelectric liquid crystal cell matrix address scheme that uses bipolar strobe pulses (20) to co-operate with bipolar data pulses (21,22) in a way that it can switch pixels into different states in a single refreshing not preceded by page blanking.

2 Claims, 7 Drawing Sheets

Fig. 3
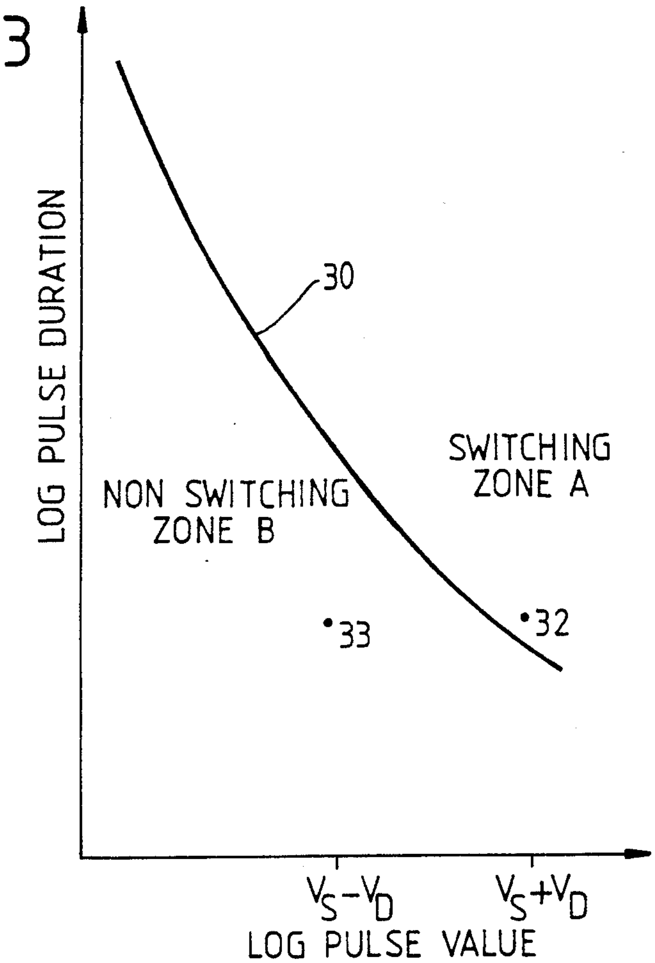
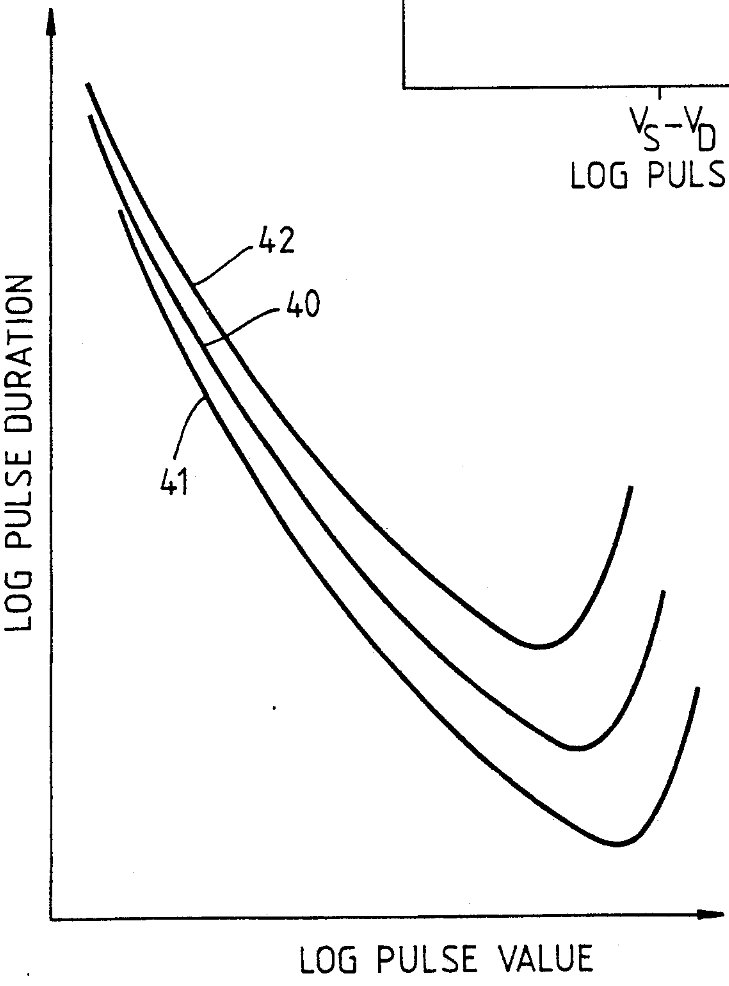
Fig. 4

ADDRESSING SCHEME FOR MULTIPLEXED FERRO-ELECTRIC LIQUID CRYSTAL

BACKGROUND TO THE INVENTION

This invention relates to the addressing of matrix array type ferroelectric liquid crystal cells. A feature of ferroelectric liquid crystal cells is that the permanent dipole moment of the liquid crystal interacts with an applied electric field and hence the response is different according to whether the applied field points in one direction, or points in the opposite direction.

A number of prior art matrix addressing schemes for such cells, including for instance that described in GB 2 173 629 A, have involved addressing on a line-by-line basis using unipolar strobe pulses applied sequentially to the members of a first set of electrodes to co-operate with bipolar data pulses applied in parallel to the members of a second set of electrodes. In the first scheme described in that specification the strobe pulses are of amplitude $|V_S|$ and duration $t_s$, while the data pulses are charge balanced pulses, which make a first voltage excursion of amplitude $|V_D|$ and duration $t_s$ in one direction which is immediately followed by an oppositely directed voltage excursion also of amplitude $|V_D|$ and duration $t_s$. The strobe pulses are synchronised with the first voltage excursions of the data pulses, and the operation of the addressing scheme is described on the basis that the magnitudes of $V_S$ and $V_D$ are chosen so that exposure of a pixel to a pulse of magnitude $|V_S+V_D|$ for a duration $t_s$ is sufficient to effect switching of the pixel, whereas pulses of similar duration, but of amplitudes $|V_S-V_D|$ or $|V_D|$, are insufficient to effect switching.

Although the switching stimulus is applied only for a duration $t_s$, the data pulses are twice as long as this, and hence the line address time is 2 $t_s$. Moreover, since the strobe pulse is unipolar, a single strobe pulse can switch pixels in one direction only.

The constraint of being able to switch pixels in only one direction in any one line address time means that complete freedom to change all the pixels of a display involves either erasure prior to writing, for instance a page erase before line-by-line writing, or writing a first field using strobe pulses of one polarity followed by the writing of a second field using strobe pulses of the opposite polarity.

Some examples of addressing schemes which use bipolar strobe pulses, and which in consequence are capable of switching pixels in either direction, are described in GB 2 146 473A. Thus the addressing scheme of that specification described with particular reference to its FIG. 3 uses a charge balanced bipolar strobe pulse which makes a first excursion of amplitude $|V_S|$ and duration $t_s$ in one direction, which is immediately followed by a oppositely directed voltage excursion also of amplitude $|V_S|$ and duration $t_s$. This strobe pulse co-operates with charge balanced bipolar data pulses of similar format, but in which the excursions are of amplitude $|V_D|$ and duration 2 $t_s$. The two voltage excursions of the strobe pulse are in this instance synchronised with the second voltage excursions of the data pulses. In this scheme the switching stimulus of magnitude $|V_S+V_D|$ is applied only for a duration $t_s$, but the data pulses are four times as long as this, and hence the line address time is 4 $t_s$.

SUMMARY OF THE INVENTION

The present invention is directed to an addressing scheme which uses bipolar strobe pulses, and hence is capable of switching pixels in either direction, and which permits a line address time of less than 4 $t_s$. This is accomplished by the use of strobe pulses that are longer in duration than the data pulses.

With this relationship of pulse durations it is arranged that in the addressing of any given pixel the data pulse coincident with the beginning part of the strobe pulse determines the final state of that pixel upon completion of the addressing. For data pulses of one data significance the co-operative effect of the data pulse and the beginning part of the strobe pulse produces switching into the required state, whereas for data pulses of the other data significance switching into the required state is accomplished by the co-operative effect of the ending part of the strobe pulse and the next succeeding data pulse irrespective of its data significance.

According to the present invention there is provided a method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, which pixels are selectively addressed on a line-by-line basis by applying strobe pulses sequentially to the members of the first set of electrodes while data pulses are applied in parallel to the members of the second set of electrodes wherein a data pulse of one data significance is a charge balanced bipolar pulse of duration 2 t which makes a first voltage excursion to a voltage $+V_D$ for a duration t followed by a second voltage excursion to a voltage $-V_D$ for a further duration t, wherein a data pulse of the opposite data significance is a charge balanced bipolar pulse also of duration 2 t which makes a first voltage excursion to a voltage $-V_D$ for a duration t followed by a second voltage excursion to a voltage $+V_D$ for a further duration t, wherein a strobe pulse is a charge balanced bipolar pulse of duration 3 t which makes a first voltage excursion to a voltage of modulus $|V_S|$ for a duration t followed by a zero volts dwell time of duration t, followed by a second voltage excursion oppositely directed to the first and also to a voltage of modulus $|V_S|$ for a duration t, and wherein the first and second voltage excursions of the strobe pulses and synchronised with the first voltage excursions of the data pulses.

BRIEF DESCRIPTION OF THE DRAWINGS

There follows a description of a ferroelectric liquid crystal cell and of a method of addressing it in a manner embodying the invention in a preferred form. In the description reference is made to the accompanying drawings in which:

FIG. 3 is a graph depicting a switching characteristic relating pulse duration with pulse amplitude necessary to effect switching;

FIG. 4 is a graph depicting the effects of preconditioning pulses upon the switching characteristic;

DETAILED DESCRIPTION OF THE PREFERRED EMBODIMENT

Figure 1:
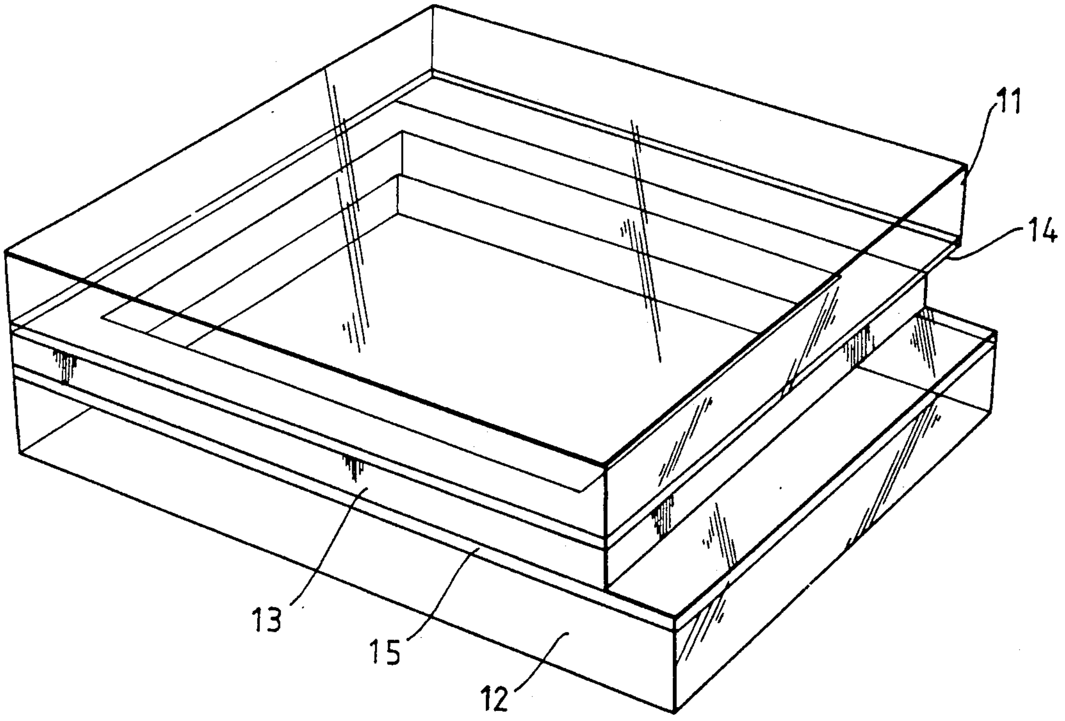
FIG. 1 depicts a schematic perspective view of a liquid crystal cell.

Referring now to FIG. 1, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and one or sometimes both of these electrode layers is covered within the display area defined by the perimeter seal with a polymer layer (not shown), such as nylon, provided for molecular alignment purposes. The nylon layer is rubbed in a single direction so that, when a liquid crystal is brought into contact with it, it will tend to promote planar alignment of the liquid crystal molecules in the direction of the rubbing. If the cell has polymer layers on both its inward facing major surfaces, it is assembled with the rubbing directions aligned parallel with each other. This is the preferred arrangement, but an alternative involves the rubbing directions being aligned anti-parallel, and a further alternative involves there being a small offset in angle with the object of causing non-driven areas to be oriented in a non-random way. Before the electrode layers 14 and 15 are covered with the polymer, each one is patterned to define a set of strip electrodes (not shown) that individually extend across the display area and on out to beyond the perimeter seal to provide contact areas to which terminal connection may be made. In the assembled cell the electrode strips of layer 14 extend transversely with respect to those of layer 15 so as to define a pixel at each elemental area where an electrode strip of layer 15 is overlapped by a strip of layer 14. The thickness of the liquid crystal layer contained within the resulting envelope is determined by a light scattering of polymeric spheres of uniform diameter throughout the area of the cell. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed). The filling operation is carried out with the filling material heated into its nematic or isotropic phase so as to reduce its viscosity to a suitable low value. It will be noted that the basic construction of the cell is similar to that of for instance a conventional twisted nematic, except of course for the parallel alignment of the rubbing directions.

Typically the thickness of the perimeter seal 13, and hence also of the liquid crystal layer, is between 1.5 to 3 $\mu$m, but thinner or thicker layer thicknesses may be required to suit particular applications. A preferred thickness is 2 $\mu$m. A suitable material for the filling is the smectic C eutectic marketed by BDH of Poole in Dorset under the designation of SCE3. This material, which exhibits negative dielectric anisotropy at least over the frequency range from 1 kHz to 40 kHz, passes through the nematic and smectic A phases on cooling into the smectic C phase from the isotropic phase. In the case of a 2 $\mu$m thick liquid crystal layer confined between the rubbed surfaces, the entry of the material into the smectic A phase causes the smectic layers to be formed with bookshelf alignment (layers extending in planes to which the rubbing direction is normal), and this alignment of the smectic layers appears to be preserved when the material makes the transition into the smectic C phase.

For the addressing of this cell on a line-by-line basis a charge balanced bipolar strobe pulse is applied in turn to the row electrodes of the cell constituted by the strip electrodes of electrode layer 14 while charge balanced bipolar data pulses are applied in parallel to the column electrodes which are constituted by the strip electrodes of electrode layer 15.

Figure 2:
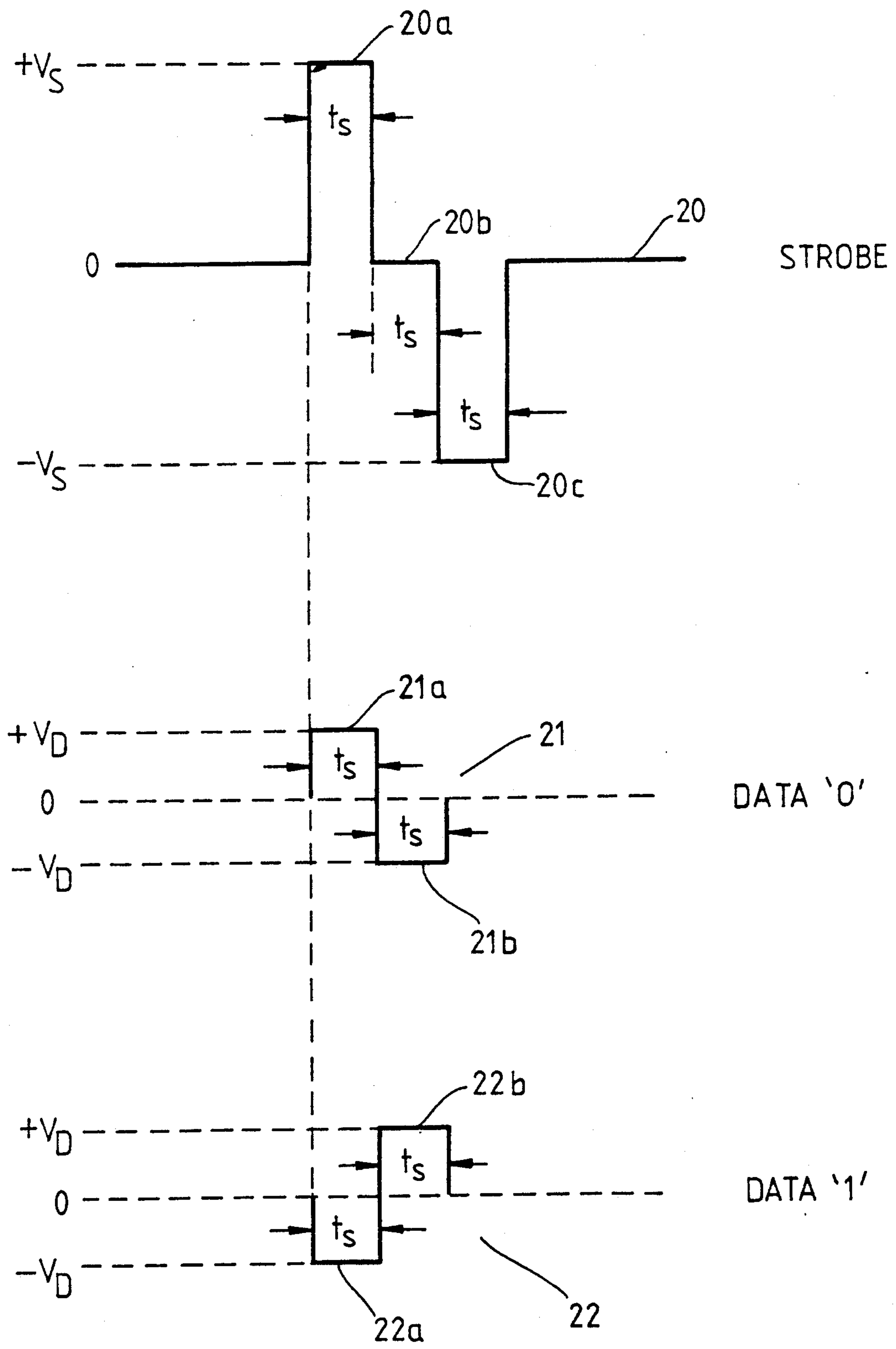
FIG. 2 depicts waveforms employed in the addressing of the cell of FIG. 1 on a co-ordinate basis.

The waveforms of the strobe pulse and data pulses of opposite data significance are depicted in FIG. 2 respectively at 20, 21 and 22. A strobe pulse 20 consists of a first voltage excursion **20*a* to a voltage $+V_S$ for a duration $t_s$, followed by a zero volts dwell time 20*b* for a duration $t_s$, which is itself followed by a second voltage excursion 20*c* to a voltage $-V_S$ also for a duration $t_s$. The data pulse 21 of one data significance, arbitrarily designated a data "0" pulse, consists of a first voltage excursion 21*a* to a voltage $+V_D$ for a duration $t_s$, followed by a second voltage excursion 21*b* to a voltage $-V_D$ also for a duration $t_s$. The data pulse 22, arbitrarily designated a data "1" pulse, is the inverse of a data "0" pulse, and comprises a first voltage excursion 22*a* to a voltage $-V_D$ and a second voltage excursion 22*b*** to a voltage $+V_D$, both voltage excursions being of duration $t_s$.

The switching of a ferroelectric cell pixel is dependent, not only upon the voltage to which that pixel is exposed, but also upon the duration for which that voltage is maintained. A typical characteristic is depicted at 30 in FIG. 3 in which log switching voltage duration (response time) is plotted as function of log switching voltage value. This characteristic separates a zone A, the zone in which the switching stimulus is sufficient to effect switching, from a zone B, the zone in which the stimulus does not produce a lasting effect. For a particular pulse duration $t_s$ there is no apparent problem in choosing appropriate values of the strobe and data pulse voltages $V_S$ and $V_D$ so that $(V_S+V_D)$ lies safely within zone A. Then, by choosing a value of the data pulse voltage $V_D$ that is not too small in relation to the value of the strobe pulse voltage $V_S$, it is evident that it is possible to arrange that $(V_S-V_D)$ lies safely within zone B for a pulse of duration $t_s$. It must be noted however, that the coincidence of a data '0' pulse 21 and the positive-going voltage excursion of a strobe pulse 20 does not expose the pixel to an isolated pulse of amplitude $(V_S-V_D)$, and duration $t_s$, but rather than it will inevitably be immediately followed by a pulse of amplitude $V_D$ and duration $t_s$, and that, depending upon the data significance of the preceding data pulse, it may also be immediately preceded by a pulse of amplitude $V_D$ and duration $t_s$.

Suppose by way of example the values of the strobe and data pulse voltages $V_S$ and $V_D$ are as represented in FIG. 3, then the coincidence of a positive-going portion of a strobe pulse 20 with the negative-going portion of a data '1' pulse 22 exposes the pixel to a waveform whose $(V_S+V_D)$ component for a duration $t_s$ is sufficient to provide a switching stimulus corresponding to the operating point 32 lying safely within the switching zone A. An isolated stimulus of amplitude ($V_S - V_D$) for duration $t_s$ would provide a switching stimulus corresponding to the point 33 lying safely within the non-switching zone B, but, as explained in the preceding paragraph, addressing the pixel by coincidence of the positive-going portion of a strobe pulse 20 with the positive-going portion of a data '0' pulse does not produce an isolated ($V_S - V_D$) stimulus, and so the real stimulus corresponds to some real operating point above the level of point 33. If the values of $V_S$ and $V_D$ have been chosen so that $V_S = 2V_D$, then $V_D = (V_S - V_D)$, and the real stimulus will provide a real operating point vertically above point 33. In the case that the data '0' pulse was immediately preceded by a data '2' pulse, this real stimulus will provide a real operating point that is vertically above point 33 at the point where the ($V_S - V_D$) abscissa intersects the 3 $t_s$ ordinate. Depending upon the gradient of the characteristic curve, this real operating point may be within the switching zone A rather than, as desired, within the non-switching zone B.

One implication of the curve 30 is that if it is wished to obtain a faster response by using isolated pulses of a shorter duration, it is necessary to employ higher voltages. The fact that the curve shows a reduction in the steepness of the gradient with increasing voltage implies that there may be a limiting value of pulse duration below which an isolated pulse is so short that it will never be able to switch the pixel irrespective of how large a switching voltage is employed. In practice a typical ferroelectric material exhibits a characteristic curve of the general form depicted by curve 40 of FIG. 4 which is not monotonic but exhibits a minimum. This opens the possibility of using the positive gradient portion of the characteristic instead of the negative gradient portion, and arranging for pixels addressed by the coincidence of a strobe pulse and a data pulse to be switched when these pulses are such as to combine to develop a potential of $\pm(V_S - V_D)$, but not to switch when they are such as to combine to develop a potential of $\pm(V_S + V_D)$.

If the pixel is not exposed to an isolated pulse, but instead is exposed to a pulse which is immediately preceded by a small pulse, a preconditioning pulse of the same polarity but smaller amplitude, the division between the zone within which switching is induced and the zone within which switching is not induced is not given by curve 40, but is given by a similarly shaped curve translated downwardly and slightly to the right with respect to curve 40, such as curve 41. Switching is made more easy. Conversely, if the preconditioning pulse is of the opposite polarity, the division between the zones is given by a curve translated upwardly and slightly to the left with respect to curve 40, such as curve 42. Switching is made more difficult. In the case of a preconditioning pulse of opposite polarity, the translation of the curve is typically significantly greater than the translation produced by a preconditioning pulse of equal magnitude but of the same polarity as that of the pulse it precedes.

Considering to begin with only curve 40, and neglecting for the moment the effects of preconditioning pulses, it can be seen that, by arranging the pulse durations and voltages such as to provide an operating point for ($V_S - V_D$) lying safely inside (on the concave side of) curve 40 near its positive gradient, the fulfilling of the requirement that $V_D$ shall not be too small in relation to $V_S$ serves to assist the discrimination afforded by addressing. Now taking into account the effects of preconditioning pulses, it is seen that one can choose any operating point for ($V_S - V_D$) inside the curve 42 corresponding to a pulse duration less than that of the minimum of curve 41 and be certain that the operating point for ($V_S + V_D$) can not lie inside curve 42 and hence can not lead to spurious switching. Of course there is still the requirement that the $+V_D$ signals developed across the pixels of the unaddressed lines shall not give rise to spurious switching. The 'worst' case is a pulse of amplitude $+V_D$ maintained for a duration 2 $t_s$, such a pulse being produced at an unaddressed pixel whenever that pixel has applied to its column electrode a data pulse of one data significance followed immediately by a data pulse of the opposite data significance. Therefore $V_D$ must be chosen in relation to $t_s$ so as to ensure that this operating point also lies outside (on the convex side of) curve 42.

Figure 5:
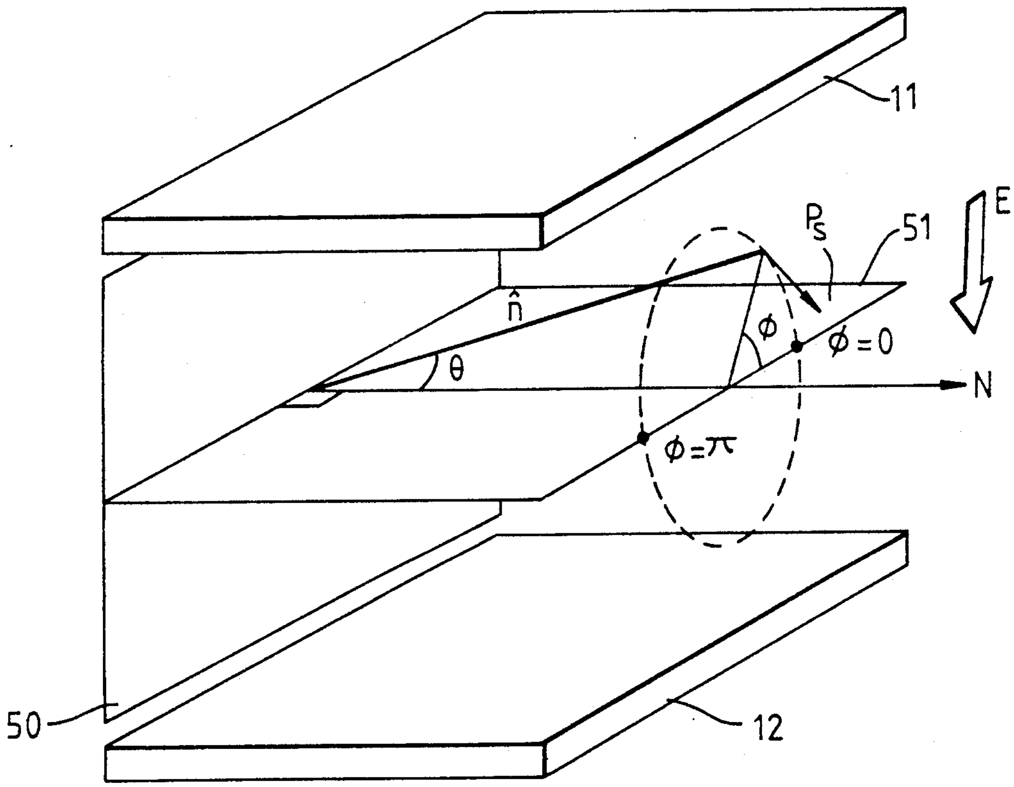
FIG. 5 is a diagram illustrating the molecular alignment within the liquid crystal layer of the cell of FIG. 1.

The ability to produce selective switching with a pulse of one amplitude inducing switching, while another pulse of the same duration but greater amplitude does not induce switching, appears to be associated with the existence of a positive gradient portion of the characteristic curves 40, 41 and 42 of FIG. 4. It is believed that these characteristic curves exhibit minima, and hence regions of positive and negative gradient, as the direct result of the conflicting torques arising from the interaction of an applied electric field (E) with the dielectric anisotropy ($\Delta\epsilon$) and with the spontaneous polarisation ($P_S$) contributions to the electrostatic free energy ($F_e$). For derivation of a formula relating these effects reference is made to the diagram of FIG. 5 which depicts at 11 and 12 the two glass sheets of FIG. 1 that define the two major surfaces of the liquid crystal layer. Plane 50 is the plane of one of the smectic layers of the liquid crystal layer, and plane 51 is a plane parallel with one of the major surfaces of the liquid crystal layer. Plane 51 contains the smectic layer normal N, which is also the rubbing direction. The direction of the applied field is given by the arrow E. If $\theta$ is the tilt angle of the smectic (the angle between the molecular director n and the smectic layer normal N), if $\phi$ is the azimuth angle of the molecular director (the angle between the plane of the major surface of the liquid crystal layer 5°, and the plane containing both the smectic layer normal N and the molecular director n), and if $\epsilon_o$ is the permittivity of free space, then the electrostatic free energy ($F_e$) is given by:

$$F_e = -P_s E \cos\phi - \tfrac{1}{2}\epsilon_o \Delta\epsilon E^2 \sin^2\phi$$

and the resulting torque ($\Omega$) is given by $$\Omega = \frac{\partial F_e}{\partial \phi} = P_s E \sin\phi - \epsilon_o \Delta\epsilon\, E^2 \sin^2\theta \sin\phi \cos\phi$$

When an electric field is applied to a pixel of the cell in such a direction as to switch the molecular director for an azimuth angle $\phi = \pi$ (corresponding to one stable state) to the azimuth angle $\phi = 0$ (corresponding to the other stable state), the pulse duration required to accomplish this switching will be dependent upon the torque ($\Omega$). From experimental studies it appears that the minimum required pulse duration for an isolated pulse occurs at a value of applied electric field ($E_{min}$)

that is approximately such as to give rise to the maximum slope of the torque close to $\phi=\pi$.

Thus the electric field that provides minimum required pulse duration occurs when:

$$\frac{\partial}{\partial E}\left(\frac{\partial\Omega}{\partial\phi}\right)=0 \text{ for } \phi=\pi$$

$$\frac{\partial\Omega}{\partial\phi}=P_sE\cos\phi-\epsilon_o\Delta\epsilon E^2\sin^2\theta\cos 2\phi$$

$$\frac{\partial}{\partial E}\left(\frac{\partial\Omega}{\partial\phi}\right)=P_s\cos\phi-2\epsilon_o\Delta\epsilon E\sin^2\theta\cos 2\phi$$

$$\text{When } \phi=\pi \text{ and } \frac{\partial}{\partial E}\left(\frac{\partial\Omega}{\partial\phi}\right)=0$$

$$E=E_{min}=-P_s/(2\epsilon_o\Delta\epsilon\sin^2\theta)$$

Figure 6:
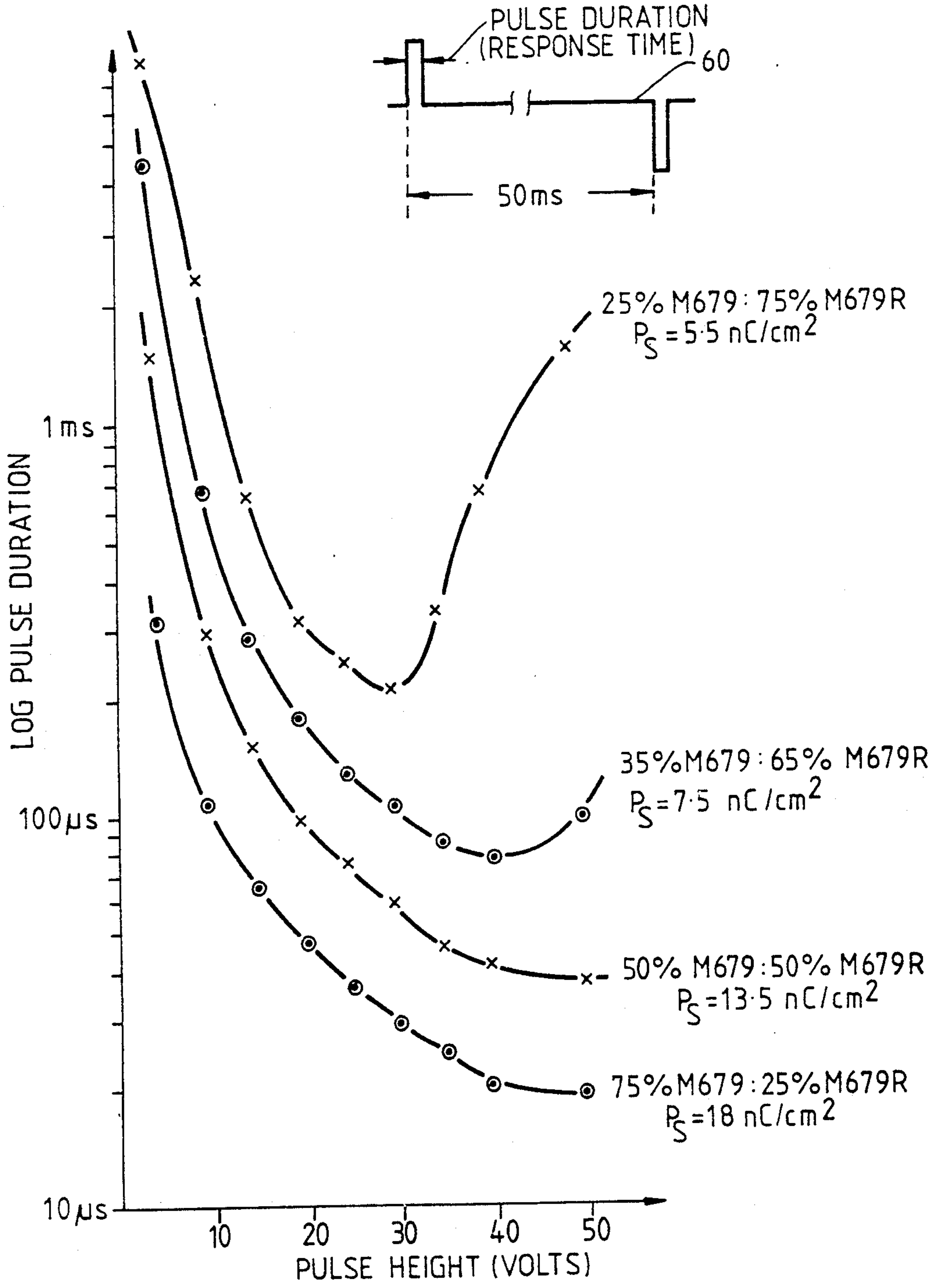
FIG. 6 is a graph depicting how the switching characteristic of a particular material varies as a function of $P_S$.

Dependence of $E_{min}$ upon $P_s$ is illustrated in FIG. 6 which shows the characteristics measured at 30° C. in a 2 $\mu$m thick cell for a set of mixtures all having the same negative dielectric anisotropy ($\Delta\epsilon\approx-1.9$) but different values of $P_s$ obtained by diluting a specific fluorinated biphenyl ester ferroelectric material supplied by BDH of Poole, Dorset and identified as M679 with different proportions of a racemic version of the same ester identified at M679R. The transition temperatures for this material are $$S_c-(96^\circ\text{ C.})-S_A-(114^\circ\text{ C.})-N-(145^\circ\text{ C.})-I$$

These characteristic curves are for isolated pulses were obtained using a waveform as schematically depicted at 60 comprising pulses of alternating polarity with a pulse repetition frequency of 20 Hz. The curves illustrate that in the case of a material with a dielectric anisotropy $\Delta\epsilon\approx-1.9$ and a $P_s$ of about 5.5 nC/cm$^2$ (55 $\mu$C/m$^2$), $E_{min}$ is fairly sharply defined, occurring at a pulse duration (response time) in the neighbourhood of 200 $\mu$s at a field strength of about 15 volts/$\mu$m. When the value of $P_s$ is increased to about 7.5 nC/cm$^2$ (75 $\mu$C/m$^2$), $E_{min}$ is less sharply defined and occurs at a response time in the neighbourhood of 80 $\mu$s at a field strength of about 20 volts/$\mu$m. By increasing the value of $P_s$ to 13.5 nC/cm$^2$ (135 $\mu$C/m$^2$) the response time at a field strength of 25 volts/$\mu$m is less than 30 $\mu$s, but $E_{min}$ appears to be somewhat higher.

Figure 7:
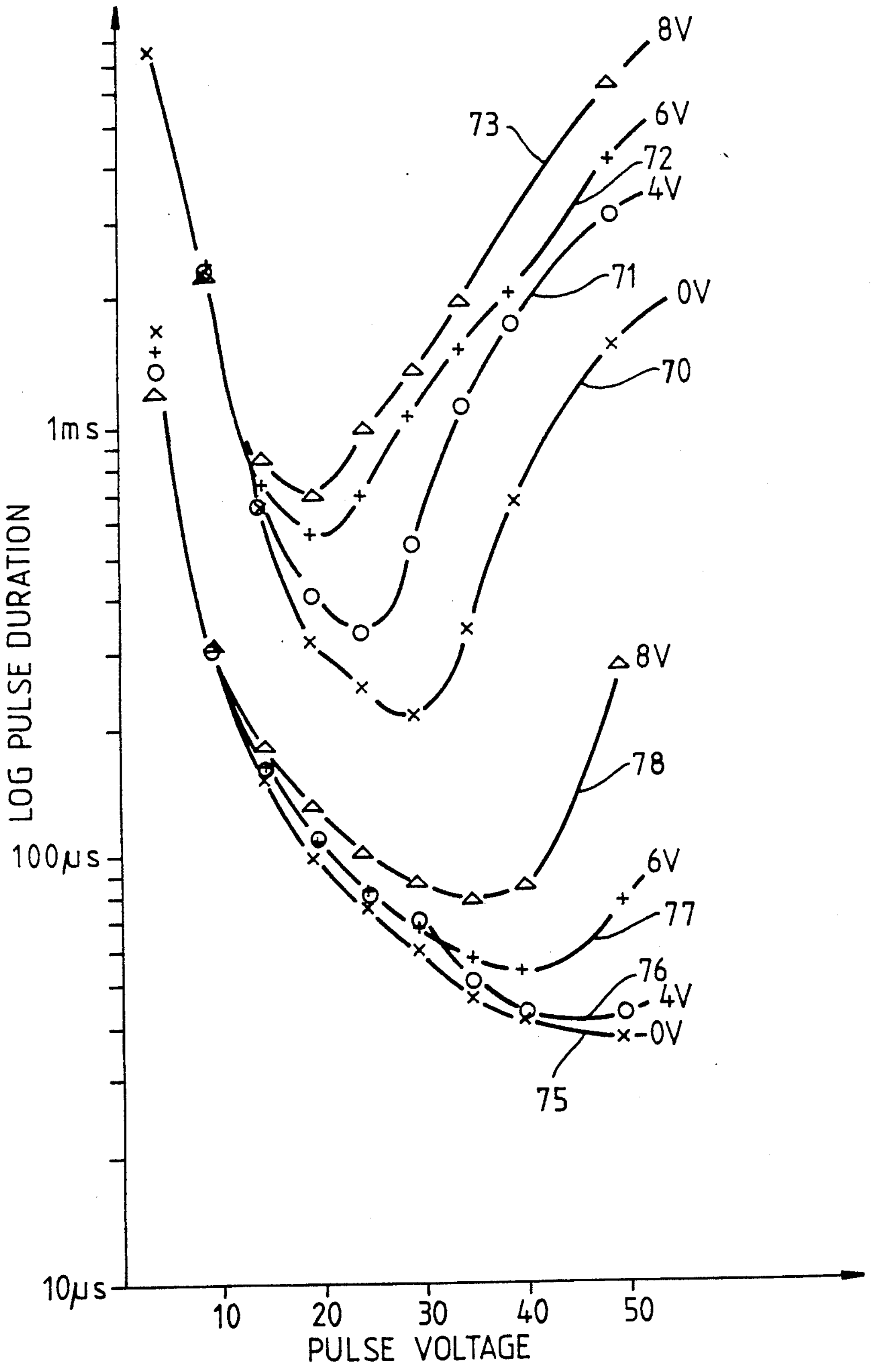
FIG. 7 is a graph depicting how the switching characteristic is modified by the presence of a.c. stabilisation.

The characteristic curves of FIG. 6 were obtained using isolated pulses, but in the normal line-by-line addressing of the pixels of a display there is liable to be a continuous data stream which produces the effect of setting the addressing pulses against a background of alternating potential. This modifies the characteristic curves as depicted in FIG. 7 which shows the effect of increasing the amplitude of the background alternating potential for a single characteristic curve of FIG. 6, namely the curve for the 25% M679:75% M679R mixture. Trace 70 depicts the characteristic curve for the waveform 60 of FIG. 6 in the presence of no background alternating potential, while curves 71, 72 and 73 depict the characteristic curves for the waveform 60 in the presence of a background alternating potential respectively of ±4 volts, ±6 volts and ±8 volts, this background alternating potential having a fundamental periodicity equal to twice the pulse duration. Traces 75, 76, 77, and 78 depict characteristic curves corresponding to traces 70 to 73, but in respect of a 50% M5679:50% M679R mixture instead of the 25%:75% mixture. From these curves it is seen that one of the effects of a background alternating potential is to increase the response time. This is not generally an advantage, but another effect can be to sharpen up the minimum as particularly illustrated in the case of the 50%:50% mixture, and this is beneficial.

To summarize, the switching characteristic of a ferroelectric liquid crystal cell, which permits its pixels to be switched using a pulse of one magnitude and duration while leaving it unswitched using a pulse of the same duration but larger magnitude, appears to be affected by a number of parameters. Thus it is affected by the composition of the material, particularly the ratio of its spontaneous polarisation to its dielectric anisotropy, by the magnitude and sign of any preconditioning pulse, and by the presence of an alternating electric field providing a switching stabilisation effect. In consequence it is not always immediately evident why a particular addressing scheme is effective in the manner actually observed.

In the present instance it appears that the positive going excursion of the strobe pulse will co-operate with a data '0' pulse to set an addressed pixel into its '0' state, and that in doing so it preconditions that pixel so that, in the time slot allocated for the addressing of the next line of pixels, this pixel is prevented from being switched back into its '2' state. On the other hand, the positive going excursion of the strobe pulse will co-operate with a data '1' pulse so as not to switch an addressed pixel into its '1' state but so as to precondition it so that in the time slot allocated for the addressing of the next line of pixels this pixel is switched into its '1' state by the negative going excursion of the strobe pulse irrespective of whether that negative going excursion is co-operating with a data 1 pulse or a data 0 pulse.

Figure 8:
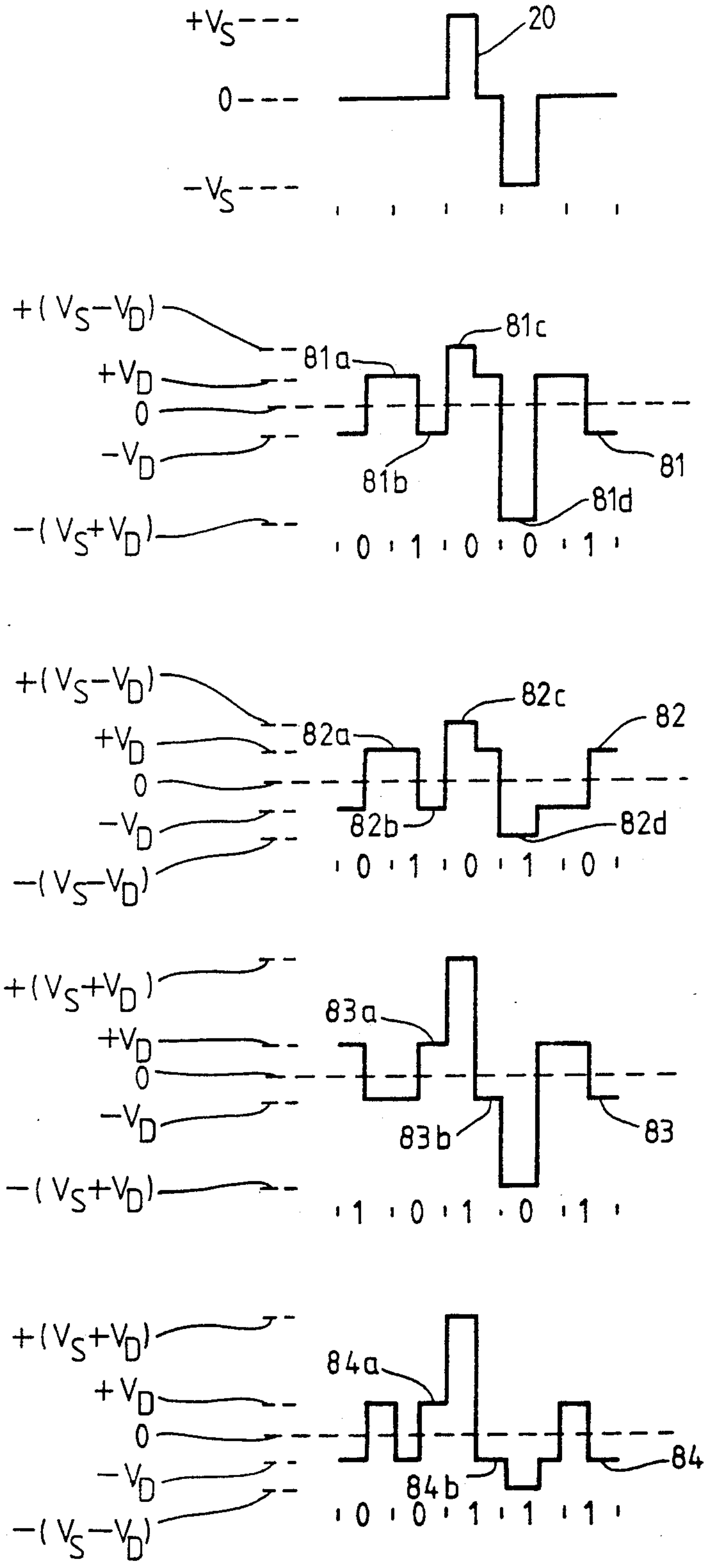
FIG. 8 depicts a number of waveforms representing the potential difference developed across a pixel when addressed with different sequences of pulses.

In FIG. 8 there is depicted a number of different waveforms representing the potential difference developed across a pixel when addressed with a strobe pulse 20 and different sequences of data pulses. In each case the positive going first voltage excursion of the strobe pulse is synchronised with the third data pulse of the data pulse sequence. The potential difference appearing across the pixel is calculated by subtracting the data pulse waveform from the strobe pulse waveform.

Waveform 81 is the waveform generated by the data sequence '0 1 0 0 1'. In this waveform the first positive going voltage excursion 81*a* to $+V_D$ for a duration 2 $t_s$, is too small to cause switching. The negative going excursion 81*b* to $-V_D$ for a duration $t_s$ is also too small to cause switching, and, although it preconditions the succeeding positive going pulse 81*c* against switching, it appears to be ineffective in this respect. Switching of the pixel into '0' state or, if the pixel was pre-existing in the '0' state, maintenance therein, is produced by the positive going voltage excursion 81*c* comprising an excursion to $(V_s-V_D)$ for a duration $t_s$ immediately followed by a move to $V_D$ for a further duration $t_s$. The following negative going excursion 81*d* to $-(V_S+V_D)$ for a duration $t_s$ is not effective in altering the switching, and so the pixel remains in the '0' state Waveform 82 is the waveform generated by the data sequence '0 1 0 1 0'. This has positive going excursions 82*a* and 82*c* which are identical with their counterparts 81*a* and 81*c* of waveform. Similarly the negative going excursion 82*b* of waveform 82 is identical with the corresponding negative going excursion 81*b* of waveform 81. On the other hand the negative going excursion 82*d* of waveform 82 is different in shape from its counterpart, starting with a smaller amplitude but extending for a longer time. It starts with an excursion $-(V_S-V_D)$ for a duration $t_s$ which is immediately followed by a move to $-V_D$ maintained for a duration 2 $t_s$. This negative going excursion 82*d* appears similarly not effective in altering the switching, and so the pixel remains in the '0' state.

Waveform 83 is the waveform generated by the data sequence '1 0 1 0 1'. This has a positive going excursion 83*a* to $+V_D$ for a duration $t_s$, which is immediately followed by a move to $+(V_S+V_D)$ for a further duration $t_s$. It is possible that this temporarily switches the pixel into the data '0' state or retains it in that state, and that the pixel is then switched into the data '1' state by the succeeding negative going excursion 83*b*. This negative going excursion is of similar shape but opposite polarity to the positive going excursion 83*a*, and comprises an excursion to $-V_D$ for $t_s$, followed by a move to $-(V_S+V_D)$ for a further $t_s$. For reasons which will be set out below, it is thought more likely however that the positive going excursion 83*a* is ineffective in producing switching, and that this data sequence the sole switching is that associated with the negative going excursion 83*b*.

Waveform 84 is the waveform generated by the data sequence '0 0 1 1 1'. It has a positive going excursion 84*a* identical with the positive going excursion 83*a* of waveform 83, and is followed by a negative going excursion 84*b* comprising an excursion to $-V_D$ for a duration $t_s$ followed by a move to $-(V_S-V_D)$ for a further duration $t_s$ which is itself followed by a move back to $-V_D$ for another duration $t_s$. (Examination of this waveform shows that this move back to $-V_D$ would be for a duration 2 $t_s$ if the last bit of the data stream were a '0' instead of a '1'. It is believed that the switching pattern produced by this waveform is similar to that obtaining with waveform 83. It could be that the pixel is temporarily switched into the '0' state by the positive going excursion that brackets the commencement of the time slot of the third bit (excursion 84*a*), and that immediately afterwards the pixel is switched back into the '1' state by the negative going excursion that brackets the commencement of the fourth time slot (excursion 84*b*). However, for reasons to be set out below, it is thought more likely that in this data sequence the sole switching is that associated with the negative going excursion 84*b*.

In the preceding paragraph it was mentioned that it is believed more likely that the positive going excursion 83*a* does not effect switching than that it does. Solely on the basis of the foregoing description relating to the effect of preconditioning pulses, it is somewhat difficult to see why, if the positive going excursion 83*a* does not effect switching, switching is nevertheless accomplished by the negative going excursion 83*b* which is the inverse of the positive going excursion 83*a*. On the other hand, if excursions 83*a* and 83*b* both induce switching, it is difficult to see why negative going excursion 82*d* does not induce switching and yet negative going excursion 84*b* does induce switching. Nevertheless, for the addressing scheme to work in the manner required, it is entirely necessary that on the one hand negative going excursion 82*d* shall not induce switching and that on the other hand negative going excursions 83*b* and 84*d* shall induce switching.

Explanation for this behaviour may be related to that responsible for another observed effect namely that, if a pixel has been switched in one direction by a pulse of amplitude (V) and duration 2 $t_s$, then it becomes progressively easier to switch that pixel in the opposite direction with a pulse of amplitude (V) and duration $t_s$ as the time interval between the two switchings is increased over at least the range of time interval extending from 10 $t_s$ to 50 $t_s$. This effect can be explained in terms of the mathematical model referred to earlier by assuming that immediately after switching the azimuth angle $\phi$ of the director n is very close to $\phi=0$ or to $\phi=\pi$, and that thereafter the azimuth angle slowly relaxes to a value rather further removed from $\phi=0$ or $\phi=\pi$. From the earlier mathematical treatment it is seen that there is no torque $\Omega$ when $\phi$ precisely satisfies the condition $\phi=0$ or $\phi=\pi$, and so it is evident that this relaxation could be associated with a progressive change from a condition in which switching is particularly difficult to initiate towards a condition in which switching is somewhat easier to initiate. On this basis it appears likely that part of the reason that neither voltage excursion 81*d* nor voltage excursion 82*d* are effective in causing switching in that both these voltage excursions occur immediately after switching voltage excursions, namely excursion 81*c* and 82*c*. It is surmised that in the case of waveform 83 that voltage excursion 83*a* does not cause switching but that it disturbs the equilibrium moving the director to an azimuthal angle $\phi$ relatively well removed from $\phi=0$ or $\phi=\pi$ where the dielectric restraining torque is so much less effective that switching is produced by the immediately following voltage excursion, namely excursion 83*b*. If that is the correct explanation, then the reason why voltage excursion 84*b* is similarly effective in inducing switching is strictly analogous.

The choice of appropriate values for the strobe and data pulse amplitudes and durations will depend upon the composition of the liquid crystal employed, its temperatures, the thickness of the liquid crystal layer, and upon other operating factors such as for instance the inclusion of an additional alternating electric field applied for stabilisation purposes. By way of specific example strobe and data voltages of ±40 volts and ±9 volts respectively were found suitable for a cell with a 1.7 μm thickness liquid crystal layer of 50% M755/50% M755R operated at 30° C.

In the foregoing specific description the addressing has been performed using a particular form of sequential line-by-line format in which the addressing of each line with data follows on without break immediately after the addressing with data of the previous line. In this way each strobe pulse co-operates not only with the data pulses pertaining to its own line but also with those pertaining to the succeeding line. It has been explained that in this way a saving can be made in the time necessary to refresh a whole page. It should however be understood that the invention can also be used to address individual lines on an isolated basis in which the signals appearing on the column electrodes that co-operate with the second voltage excursion of a strobe pulse are not provided by data pertaining to a succeeding line. In this way the invention can be used to write or update just a single line of pixels.

I claim:

1. A method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, which pixels are selectively addressed on a line-by-line basis by applying strobe pulses sequentially to the members of the first set of electrodes while data pulses are applied in parallel to the members of the second set of electrodes wherein a data pulse of one data significance is a charge balanced bipolar pulse of duration 2 t which makes a first voltage excursion to a voltage $+V_D$ for a duration t followed by a second voltage excursion to a voltage $-V_D$ for a further duration t, wherein a data pulse of the opposite data significance is a charge balanced bipolar pulse also of duration 2 t which makes a first voltage excursion to a voltage $-V_D$ for a duration t followed by a second voltage excursion to a voltage $+V_D$ for a further duration t, wherein a strobe pulse is a charge balanced bipolar pulse of duration 3 t which makes a first voltage excursion to a voltage of modulus $|V_S|$ for a duration t followed by a zero volts dwell time of duration t, followed by a second voltage excursion oppositely directed to the first and also to a voltage of modulus $|V_S|$ for a duration t, and wherein the first and second voltage excursions of the strobe pulses and synchronised with the first voltage excursions of the data pulses.

2. A method as claimed in claim 1 wherein the voltage developed across the pixels by the application to their electrodes of the data and strobe pulses is supplemented by the application of an alternating voltage stabilisation waveform which assists the stabilisation of the pixels in their switched states.

* * * * *